(12) United States Patent
Andersag

(10) Patent No.: US 11,353,053 B2
(45) Date of Patent: Jun. 7, 2022

(54) FACADE PANEL SCREW AND FASTENING ARRANGEMENT COMPRISING SAME

(71) Applicant: SFS intec Holding AG, Heerbrugg (CH)

(72) Inventor: Markus Andersag, St. Gallen (CH)

(73) Assignee: SFS intec Holding AG, Heerbrugg (CH)

( * ) Notice: Subject to any disclaimer, the term of this patent is extended or adjusted under 35 U.S.C. 154(b) by 171 days.

(21) Appl. No.: 16/507,471

(22) Filed: Jul. 10, 2019

(65) Prior Publication Data

US 2019/0331151 A1 Oct. 31, 2019

Related U.S. Application Data

(62) Division of application No. 15/928,456, filed on Mar. 22, 2018, now abandoned.

(30) Foreign Application Priority Data

Mar. 6, 2018 (EP) .................................... 18160088

(51) Int. Cl.
*F16B 25/00* (2006.01)
*E04F 13/08* (2006.01)
*E04F 13/00* (2006.01)

(52) U.S. Cl.
CPC ...... *F16B 25/0068* (2013.01); *E04F 13/0832* (2013.01); *F16B 25/0031* (2013.01);
(Continued)

(58) Field of Classification Search
CPC .............. F16B 25/0084; F16B 25/0036; F16B 25/0068; F16B 35/06; E04F 13/0832; E04F 13/0837; E04F 13/0801
(Continued)

(56) References Cited

U.S. PATENT DOCUMENTS 1,651,796 A * 12/1927 Arenz ................. F16B 25/0015
411/411
2,307,348 A * 1/1943 Anderson ............... F16B 15/02
411/487
(Continued)

FOREIGN PATENT DOCUMENTS

DE 4239333 5/1994
DE 9417276 12/1994
(Continued)

*Primary Examiner* — Flemming Saether
(74) *Attorney, Agent, or Firm* — Volpe Koenig

(57) ABSTRACT

A facade panel screw for the optimized fastening of facade panel elements on a substructure has a head with very large diameter $D_K$, a substantially cylinder cross-sectional shaft, which is at least partially provided with a thread (nominal diameter $D_S$) and a conical tip comprising a tip angle γ. The thread extends continuously from the shaft to the tip. It is characterizing that the tip angle γ is 45°+/−10°, the thread is embodied at least in a two-threaded manner, the head diameter $D_K$ is embodied at least twice as large as the nominal diameter $D_S$; and the facade panel screw does not have a drill tip. Such a facade panel screw is used in a fastening arrangement, which comprises a load-bearing component (substructure) and a facade panel. Due to its design, the facade panel screw is able to simplify the fastening of the facade panel and to at least partially correct an inclined positioning in response to the installation.

10 Claims, 3 Drawing Sheets

(52) U.S. Cl.
CPC ...... *F16B 25/0063* (2013.01); *F16B 25/0084* (2013.01); *E04F 13/00* (2013.01); *F16B 25/0021* (2013.01)

(58) Field of Classification Search
USPC .................. 411/386, 411, 412, 400, 401
See application file for complete search history.

(56) References Cited

U.S. PATENT DOCUMENTS

| | | | |
|---|---|---|---|
| 3,965,793 A | 6/1976 | Roser | |
| 4,194,430 A | 3/1980 | Muenchinger | |
| 5,294,227 A | 3/1994 | Forster et al. | |
| 5,329,738 A * | 7/1994 | Ovaert | E04D 5/142 |
| | | | 52/410 |
| 5,785,478 A * | 7/1998 | Rotter | E04F 13/0864 |
| | | | 411/487 |
| 5,870,870 A * | 2/1999 | Utzman | E04H 9/02 |
| | | | 52/483.1 |
| 6,457,926 B1 | 10/2002 | Pope | |
| 6,994,502 B2 * | 2/2006 | Winter | F16B 35/048 |
| | | | 411/411 |
| 2006/0140740 A1 | 6/2006 | Lin | |
| 2007/0183866 A1 | 8/2007 | Gallien | |
| 2008/0226424 A1 | 9/2008 | Matthiesen et al. | |
| 2019/0072124 A1 * | 3/2019 | Pawlak | F16B 5/0208 |
| 2019/0368529 A1 * | 12/2019 | Mair | F16B 25/0021 |

FOREIGN PATENT DOCUMENTS

| | | |
|---|---|---|
| DE | 102010040024 | 3/2012 |
| DE | 202008018555 | 11/2015 |
| EP | 1182367 | 2/2002 |
| EP | 1582684 | 10/2005 |
| EP | 2574703 | 4/2013 |

* cited by examiner

FACADE PANEL SCREW AND FASTENING ARRANGEMENT COMPRISING SAME

INCORPORATION BY REFERENCE

The following documents are incorporated herein by reference as if fully set forth: U.S. patent application Ser. No. 15/928,456, filed Mar. 22, 2018; and European Patent Application No. EP 18160088.3, filed Mar. 6, 2018.

FIELD OF THE INVENTION

The present invention deals with a facade panel screw comprising improved installation properties as well as with a facade panel fastening arrangement comprising such a facade panel screw.

BACKGROUND

Facade panel screw shall hereinafter define a screw, which is designed specifically for fastening panels or panel-shaped components (facade panels), respectively, to a metallic substructure, wherein the material thickness of the substructure on the fastening point is only a few millimeters. The application shall thereby not be limited to vertical fastening arrangements and facades. The term panel, facade panel or panel-shaped component, respectively, refers to all cladding elements, which are expanded in a substantially flat manner and which do not necessarily need to have a homogenous thickness. Such facade panels can be produced with a plurality of materials, e.g. of fiber cement, plastic, metal, wood or in sandwich construction of such materials, respectively.

A general requirement on the facade panel fastening is that, in addition to the dead weight of the facade panel, it can also divert external forces, which act on the panel, into the substructure. Wind suction and wind pressure as well as tensile stresses caused by sunlight need to be diverted via the fastening points. It is further important that screws for the facade panel fastening have a high reverse torque, because a loosening screw could lead to vibrations, rattling noises or to the dropping of facade panels, respectively.

PRIOR ART

Different solutions for the facade panel fastening are known in the prior art. In the case of invisible constructions, the fastening points or elements, respectively, alone are attached on the rear side and are thus not visible to the observer after installation. However, installation, maintenance and repair are extensive.

In the case of visible fastenings, rivet connections, in particular blind rivet connections and screw connections (also in combination with adhesive supports) can be used. In most cases, the facade panel elements are thereby predrilled to keep the effort at the construction site low and to ensure a uniform image of the facade on the other hand. These predrilled holes are dimensioned comparatively large in order to make it possible for the facade panel elements to escape in the installation plane in response to thermal expansion. On the other hand, such through holes of the facade panel, which are significantly larger than the nominal diameter of the used screw, virtually do not allow any guide for the screw in response to the placement process.

In the case of screw connections, self-drilling screws are used in many cases, which do not require a predrilling in the substructure. However, these self-drilling screws have disadvantages. On the one hand, they are frequently made as bimetal screws comprising a head and shaft of stainless steel and a welded-on drill tip of hard carbon steel, which makes the production more expensive. In addition, the placement of self-drilling screws requires a very clean processing, because the correction of an incorrectly placed screw, e.g. by means of inclined or non-centrical drilling, can only be corrected with effort.

In light of the foregoing, it does not appear to be efficient per se to predrill holes on the substructure on location at the construction site, because (pre-) drilling process and screwing thus become two separate operating procedures. However, the separation also has advantages in the case of expensive facade materials or in the case of particularly high required processing quality, respectively, and guarantees high resilience of each individual fastening point.

To predrill the substructure, a drilling jig can be used, which uses the prefabricated through holes of the facade panel as guide. The holes in the substructure are thus aligned exactly concentrically to the facade panel and the screw image on the facade becomes more precise. Self-drilling BiMet screws can furthermore be forgone, self-tapping screws, preferably stainless steel screws, are sufficient.

A facade panel screw according to the prior art can nonetheless not be used for the described case of application without care. To accelerate the installation, screws of this type frequently have a high pitch. Due to the fact that the substructure of material with a thickness of a few millimeters on principle consists of sheet steel or aluminum (profiles, pipes), these screws tend to cant in response to the tapping, thus in response to molding the thread into the predrilled hole. Due to the fact that, as mentioned above, the predrilled holes in the facade panel for compensating the heat expansion of the installed panel are significantly larger than the nominal diameter of the screw, the screw head of a facade panel screw needs to be designed with an even larger diameter to ensure the holding function. The protrusion of the screw head on all sides needs to also be so generous that the smallest displacement of the facade panel does not already have the result that the predrilled panel hole next to the screw head becomes visible. In the case of a head, which is so large, there is thus the risk that the edge of the screw head hits against the facade panel surface in response to being screwed in at an incline and that the tilting of the screw remains permanently visible. A point loading instead of a flat contact is thus further exerted on the facade panel, which, in turn, has disadvantages in the tolerance against thermal expansion of the facade panel.

SUMMARY

It is thus the object of the invention to describe a facade panel screw or a fastening arrangement for facade panels, respectively, which avoids the above-mentioned disadvantages, and which can furthermore be produced and processed economically.

This object is achieved by a fastening arrangement or a facade panel screw according to one or more features of the invention as described below and in the claims, which describe further alternatives and exemplary embodiments In one aspect, a facade panel screw is provided comprising a head with diameter $D_K$, a substantially cylinder cross-sectional, longitudinally expanded shaft, the surface of which is at least partially provided with a thread, with a nominal diameter $D_S$, and a conical tip comprising a tip angle γ. The thread extends continuously from the shaft to the tip. The tip angle γ is 45°+/−10°, the thread is embodied at least in a two-threaded manner, the head diameter $D_K$ is embodied at least twice as large as the nominal diameter $D_S$, and the facade panel screw does not have a drill tip.

In another aspect, a fastening arrangement is provided comprising a load-bearing component and a facade panel as well as a facade panel screw.

Other features and benefits of the invention will be apparent from the description and drawings.

DETAILED DESCRIPTION

The effect of the invention is based on a specific selection and exact coordination of geometric dimensions of the facade panel screw and the fastening arrangement with one another. The principle shall be described below by reference to the schematic FIGS. 1 to 6, which are not true to scale, whereby FIGS. 1 and 2 serve to identify the geometric variables. So as not to overload the figures, some designations are only shown therein, identical components, however, also have the same meaning in FIGS. 3 to 6. The components S0 to S4 identify screws comprising an identical nominal outer diameter $D_S$. If only the component S is referred to, this shall likewise refer to S0 to S4.

Figure 1:
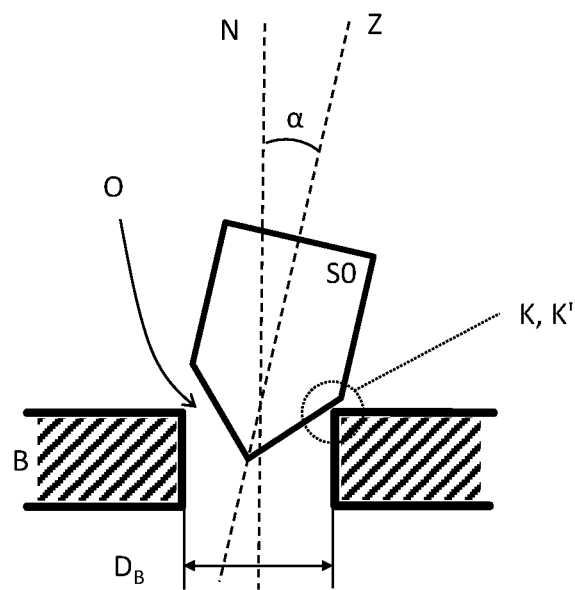
FIG. 1 shows a cross section through a schematic screw-in situ for explaining parameters.
Figure 2:
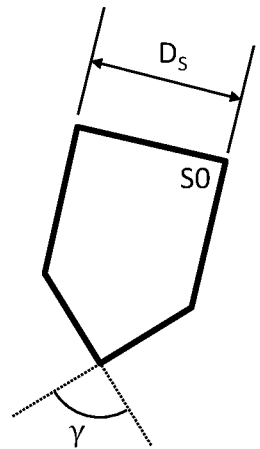
FIG. 2 shows a screw S with parameters in a schematic view.

FIGS. 1 and 2 identify different parameters of a fastening arrangement or of a facade panel screw, respectively. S0 shows a schematized, highly shortened screw comprising diameter DS. The installation situation into a component B shows that the screw S0 is tilted by an angle α with respect to the perpendicular N onto the component B. B has a predrilled hole/through hole O comprising diameter DB. K or also identified as K', respectively, in later Figures, identifies the contact point or the contact surface, respectively, or contact line between the screw S and the edge of the opening O in the component B.

The tip angle γ of the screw S0 is additionally marked in FIG. 2. Due to the fact that the invention describes a screw without drill tip, the tip is embodied with straight flanks according to the prior art.

Figure 4:
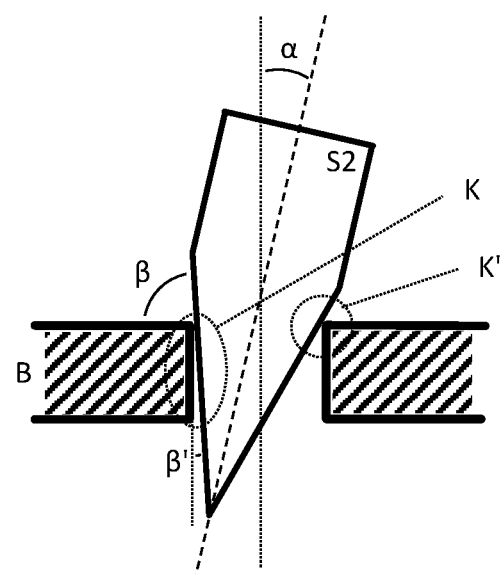
Figure 5:
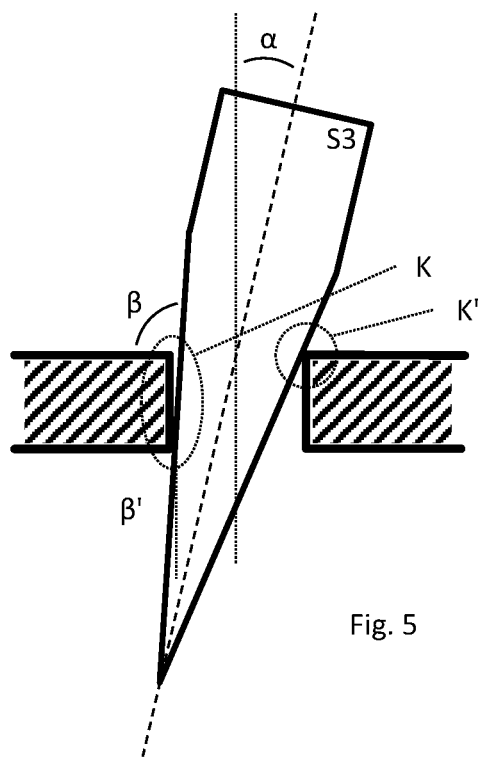
Figure 6:
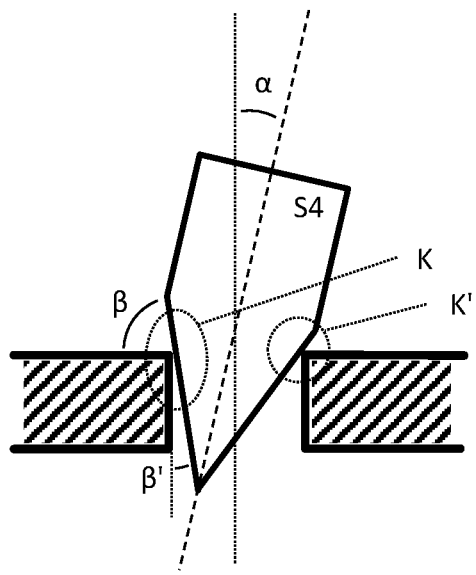

FIGS. 4 to 6 show screw-in scenarios with screws S1 to S4 in a schematized manner for comparability. They differ in their tip geometry, wherein the cone angle γ of the tip decreases from S1 to S3. The tilt angle α is identical in each case. The effect of the different contact points or surfaces, respectively, has been explained above.

Figure 7:
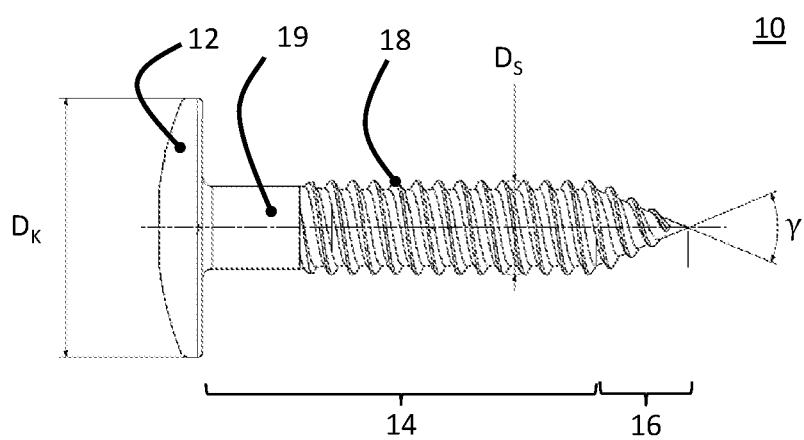
FIG. 7 shows an embodiment of a facade panel screw according to the invention.

FIG. 7 shows a first embodiment of a facade panel screw 10 according to the invention. It comprises a head 12, the diameter of which is a multiple of the screw diameter DS. The shaft 14 adjoins the head, followed by the conical tip 16. The shaft supports a thread 18, which is at least double-threaded according to the invention, which transitions continuously from the shaft to the cone or the tip 16, respectively. Subhead section 19 as part of the shaft 14 is embodied without a thread.

Figure 8:
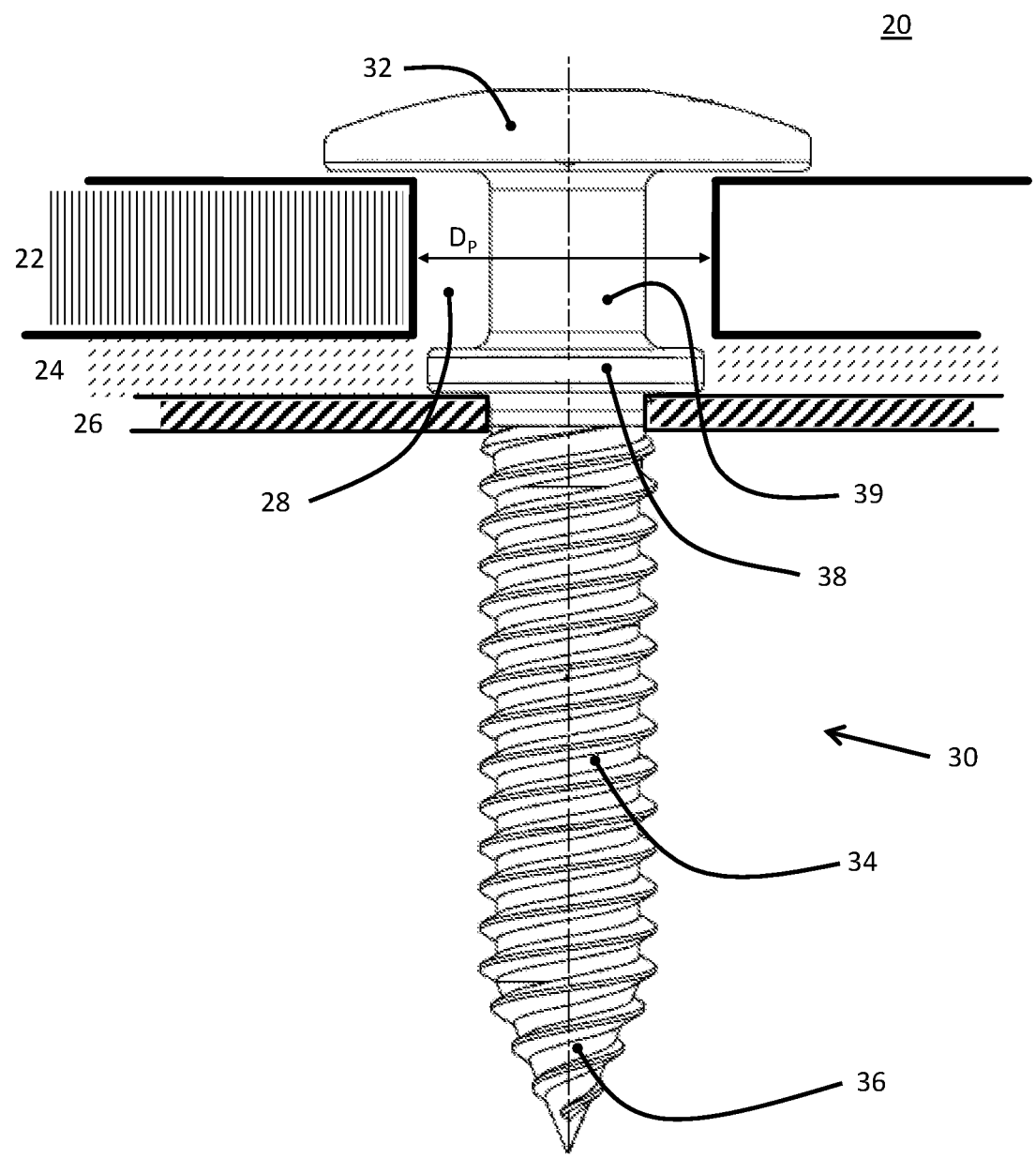
FIG. 8 shows a further embodiment of a facade panel screw according to the invention in the installed state in side view/partial cross section.

FIG. 8 shows a second embodiment 30 of a facade panel screw according to the invention. Except for the stop collar 38, it has the same functional groups. The head is identified with 32, followed by shaft 34 and tip 36. The shaft supports the stop collar 38 between the thread (section) and the thread-free subhead section 39. The facade panel screw 30 according to the invention is shown installed into a fastening arrangement 20. In addition to the screw 30, it comprises a facade panel 22 and a load-bearing component 26. The latter is or is part of the substructure. An intermediate layer 24, which can be embodied as an elastic, damping foam strip, is further illustrated. Provision is made between the facade panel 22 and thread-free subhead section 39 for a clearance, which allows lateral play to the installed facade panel 22, in order to equalize different expansions from the substructure 26 and the facade panel 22, and to thus prevent a distortion of the facade.

S1 to S4 differ predominantly in their tip geometry, more accurately in the cone angle γ of the tip. Cone shall thereby refer to a conical as well as to a truncated cone-shaped tip. The embodiments for the cone angle γ of the tip apply analogously. Z identifies the rotational or central longitudinal axis, respectively, of each screw S. B identifies a substructure or a support, respectively, which has a pre-drilled opening O comprising the diameter $D_B$; $D_B$ shall be identical for all considered cases of FIGS. 1 and 3 to 6. B refers preferably to a metallic component, for example a metal sheet or profile comprising a thickness of a few millimeters. K or K', respectively, identify contact points, on which a screw S makes contact with B in a non-positive manner when being screwed in.

In FIGS. 1 to 6, the axis Z is generally inclined by an angle α against the vertical N to B (FIG. 1), the screw S is thus attached to or in the provided through hole, respectively, so as to be tilted. If the screw would be arranged perfectly vertically (α=0°), a complete contact line would be created between the circumference of the through hole O and a circle on the cone of the screw tip. In response to the inclined attachment, however, the screw will abut on two points or on circular arc segments K and K', respectively, on the circumference of the bore O. These circular arc segments become shorter, the larger the tilt.

Figure 3:
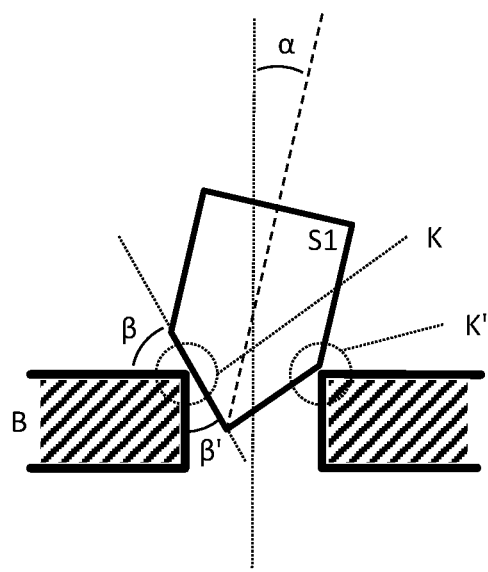
FIGS. 3 to 6 show screw-in situations of screws comprising conical tips of different designs.

In the considerations for an optimized facade panel screw, the size of the angle γ of the screw tip is important. FIGS. 3 to 6 each further show angles β and β'. β represents the angle between the plane of the component B and the adjacent cone flank of the screw tip; β' identifies the angle between the cylinder wall of the predrilled hole O and the same cone flank. FIG. 3 shows S1 with an obtuse tip cone with γ≈90°. According to experience, the screw-in behavior or tapping, respectively, is not optimal here. The behavior becomes understandable, because β and β' turn out to be approximately identical in the case of the chosen angle α and the obtuse cone (γ=>90°). This has the effect that none of the flank areas K or K' preferably taps into the material of B.

In the case of an acute cone (γ<40°) as in FIG. 4, β reaches almost 90°, while β' goes towards zero. If, in the case of the same angular orientation of the screw, the cone of the screw tip would become even narrower (S3, γ<30°, FIG. 5), the angle becomes β>90° and the angle β' even becomes negative. As can be seen, the screw cone even strikes the outlet of the hole on the edge in the case of the specified geometry.

The pointed cone of FIG. 4 shows that the contact area K and thus the thread arranged on the cone is in better contact with the material of B than the cone area in K'. As a result, the tapping into the material of the predrilled hole O will preferably occur at the location. This results in a positioning effect for the screw S, in other words, the initial tilt angle α becomes smaller when being screwed in.

The conclusion could be drawn from this to design a facade panel screw for this application to be particularly pointed. However, the geometry of FIG. 5 shows that the described advantages do not apply for angles γ with any point. In FIG. 4, a straightening of the screw in response to simultaneously sinking into the predrilled hole will have the effect that the angle β' can increase. The straightening movement of the screw is only stopped by the increasing tapping of the thread into the bore opening O, wherein the contact surface K in FIG. 4 can decrease temporarily. In FIG. 5, in contrast, β' is negative and the contact surface K initially becomes larger in response to the straightening (a decreases) and thus the degree of the molding.

A design with a very pointed cone angle γ will thus tend to allow for a self-correction and thus for a straightening of the screw S3, which is smaller than a moderate orientation as S4 or S2. In addition, the very pointed cone angle γ is more difficult to produce in the case of screws, it tends to bend on the tip and the risk of injury is also higher during handling. In addition, the tip requires a certain clearance behind the component B, which can be problematic.

It has furthermore been recognized that it is particularly advantageous to design the thread to be double-threaded. A double-threaded thread as compared to a single-threaded thread offers a higher density on thread crests with the same level of pitch. It had been shown that there is the tendency that a present material edge of B centers in a thread groove when screwing in the screws S in the case of single-threaded threads. In the case of a double-threaded screw, this effect is significantly less likely. In addition, the tapping process runs better, because more tapping thread crests per unit of length of the screw are present. This, in turn, also improves the reverse torque, which is also determined by the contact surface between the material of B and the thread flanks.

It is clear that the above statements require certain geometric ratios of the facade panel screw, such as the fastening arrangement. As outlined above, they need to be coordinated with one another in such a way that they synergistically optimize the quality of the fastening.

In summary, a facade panel screw 10 according to the present invention will have a very large measuring head 12 comprising diameter $D_K$, which is followed by a substantially cylinder cross-sectional, longitudinally extended shaft 14. The surface thereof is at least partially provided with a thread 18 with a nominal diameter $D_S$. The conical tip 16 has a tip angle γ and the thread 18 extends continuously from the shaft 14 to the tip 16.

It is characteristic thereby that the tip angle γ is 45°+/−10°, preferably +/−5° and that the thread is embodied at least in a two-threaded manner. On the one hand, this provides for a quick screw-in of the screw, because the screw pitch is high. It is ensured at the same time that sufficient thread flanks per screw length are available, so that the screw engages with or taps into, respectively, the surrounding material in a secure manner. The head diameter $D_K$ is embodied to be at least twice as large as the nominal diameter $D_S$. The facade panel screw 10 does not require a drill tip.

With this combination of these characteristics it is attained that the screw is enabled to correct the tilt angle α in response to the molding or tapping, respectively.

Such a facade panel screw 10 is preferably made integrally. According to the use as facade panel screw, stainless steel, in particular high-strength stainless steel, is preferred as material for production. The screw can be produced in an efficient cold forming process.

In one embodiment, the facade panel screw 10 can receive a decorative, functional or corrosion-inhibiting coating, respectively. The screw can in particular be adapted to the facade panel in terms of color, so that the fastening points are less conspicuous. A galvanizing or an overcoating of wax would be conceivable as functional coating, which facilitates the molding into the substructure. An overcoating with other, additional corrosion protection measures, e.g. against seawater/spray, contact corrosion is also possible, depending on the application. A combination of these measures can also be appropriate, depending on the application.

In an alternative, the facade panel screw 10, 30 according to the invention can further have a thread-free subhead section 19, 39 on the shaft 14, 34. It marks the area, in which the screw is located in the predrilled hole in the installed state of the facade panel. A thread is not necessary there.

In a further, advantageous alternative of a facade panel screw 30, the screw can have a stop collar 39, which is arranged on the shaft 34 between the thread section and the thread-free subhead section 39. This collar 39 acts as depth stop, which can allow an overwinding of the screw and thus ensures a reversing safety. It further ensures that the screw head reaches a defined distance to the contact surface of the substructure. The distance between stop collar and subhead surface is typically chosen so as to match the thickness of the facade panel.

In a preferred implementation, a facade panel screw 10, 30 will have a nominal diameter of 4-7 mm, preferably 5-6 mm (in each case inclusive) and a pitch of between 2 and 3 mm (in each case inclusive).

A fastening arrangement 20 according to the invention comprises a load-bearing component 26 and a facade panel 22 as well as a facade panel screw 10, 30 of the above-described type. The load-bearing component 26 is understood as part of a substructure, which has a material thickness of between 2 and 6.5 mm in the case of aluminum or between 0.9 and 2.5 mm in the case of steel, respectively, on the fastening point.

The facade panels 26 mentioned in the present invention are typically made of plastic, metal, fiber cement, insulating materials or of a composite of a plurality of such materials. They have predrilled holes, the diameters $D_P$ of which are at least 50% larger than the nominal diameter $D_S$ of the facade panel screw 10, 30. These predrilled holes in the facade panel, in turn, can serve as guides in response to introducing predrilled holes in the load-bearing component 26 or the substructure, respectively. A drill jig, which supports a centered, vertical predrilling into the substructure, can be used for this purpose. It is thus ensured that the predrilled holes in the substructure are concentrically and aligned with the predrilled holes in the facade panel. The diameter of the predrilled hole in the substructure or component 26, respectively, is preferably maximally 2 to 2.5 mm smaller than the nominal diameter $D_S$ of a facade panel screw 10, 30.

After correct installation, the predrilled hole $D_P$ in the facade panel, which is large as compared to the nominal screw diameter $D_S$, creates a floating point, thus a fastening with play to all sides. If a fixed point without such a play is to be placed instead of the floating point, a sleeve, which is dimensioned such that the clearance 28 between the facade panel 22 and the thread-free subhead section 19 is filled up, can be slid over the shaft without a change to the drill jigs or predrilled holes prior to placing the screw 10. The sleeve thus has an outer diameter, which is slightly smaller than $D_P$ and an inner diameter, which is slightly larger than $D_S$ and a height, which is slightly smaller than the thickness of the facade panel 22. Due to the fact that the slide-on would not be possible for a design as shown in FIG. 8, it would lend itself here to embody the collar 38 as cylinder, which reaches to the head 32 with uniform diameter.

In a further alternative of a fastening arrangement 20, a damping, insulating, friction-reducing and/or adhesive intermediate layer can be applied between the load-bearing component 26 and the facade panel 22. The intermediate layer 24 can in particular be a foam strip, an adhesive strip, an insulating felt or a plastic layer, respectively.

The features of the invention disclosed in the above description, in the drawings as well as in the claims can be significant for the realization of the invention both alone and in any, but technical meaningful or advantageous combination, respectively. A non-explicit illustration or description of a combination of features does not mean that such a combination is ruled out.

LIST OF REFERENCE NUMERALS

S, S0, S1 . . . S4 screw, facade panel screw
Z rotational or central longitudinal axis, respectively
B substructure, support, metal sheet, metallic component, profile
  O opening in B
  N vertical, perpendicular on B
  $D_B$ diameter of O in B
  $D_S$ diameter of S, S0 . . . S4
  $D_K$ head diameter
  $D_P$ diameter of the predrilled holes in facade panel 22
  K, K' contact point(s)
  α tilt angle of the axis Z based on N
  β angle between the plane of B and cone flank of S
  β' angle between the cylinder wall of O and cone flank of S
  γ cone angle of the tip of S, S0 . . . S4
  10, 30 facade panel screw
  12, 32 head
  14, 34 shaft
  16, 36 (conical) tip of the screw 10
  18 thread, thread section
  19, 39 thread-free subhead section
  38 collar, stop collar
  20 fastening arrangement
  22 facade panel
  24 intermediate layer
  26 load-bearing component, substructure, profile
  28 clearance

The invention claimed is:

1. A fastening arrangement for facade panels, comprising:
a load-bearing component,
a facade panel,
at least one of a damping, insulating, friction-reducing or adhesive intermediate layer attached between the load-bearing component and the facade panel, and
a facade panel screw, the facade panel screw comprising:
  a head with diameter $D_K$,
  a substantially cylinder cross-sectional, longitudinally extending shaft, a surface of which is at least partially provided with a thread, with a nominal diameter $D_S$ of 4-7 mm,
  and a conical tip comprising a tip angle γ, wherein the thread extends continuously from the shaft to the tip,
  the tip angle γ is 45°+/−10°,
  the thread is embodied as at least a two-lead thread having a pitch of 2-3 mm,
  the head diameter $D_K$ is at least twice as large as the nominal diameter $D_S$,
  a thread-free subhead section on the shaft,
  a stop collar arranged on the shaft between the thread and the thread-free subhead section, the stop collar having a diameter greater than the thread-free subhead section on the shaft; and
  the facade panel screw does not have a drill tip;
wherein the facade panel screw is installed through a pre-drilled hole in the facade panel and into the load-bearing component until the stop collar reaches a contact surface of the load bearing component with the stop collar being located axially in an area of the intermediate layer between the facade panel and the substrate, and the pre-drilled hole has a hole diameter $D_P$ that creates a clearance from the thread-free subhead section to form a floating point connection.

2. The fastening arrangement according to claim 1, wherein the facade panel screw is integrally formed.

3. The fastening arrangement according to claim 1, wherein the facade panel screw is made of stainless steel.

4. The fastening arrangement according to claim 1, further comprising at least one of a decorative, functional or corrosion-inhibiting coating on the facade panel screw.

5. The fastening arrangement according to claim 1, wherein the facade panel screw has a nominal diameter of 5-6 mm.

6. The fastening arrangement according to claim 1, wherein the load-bearing component is part of a substructure made of aluminum that has a material thickness of between 2 and 6.5 mm or is part of a substructure made of steel that has a material thickness of between 0.9 and 2.5 mm at a fastening point.

7. The fastening arrangement according to claim 1, wherein the facade panel is formed of plastic, metal, fiber cement, insulating materials or of a composite of one or a plurality of said materials.

8. The fastening arrangement according to claim 1, wherein the diameters $D_P$ of the pre-drilled holes are at least 50% larger than the nominal diameter $D_S$ of the facade panel screw.

9. The fastening arrangement according to claim 1, further comprising pre-drilled holes in the load-bearing component or in a substructure attached to the load-bearing component, respectively, that are concentric and aligned to the predrilled holes in the facade panel, and diameters of the pre-drilled holes in the load-bearing component or in the substructure are maximally 2 mm smaller than the nominal diameter $D_S$ of the facade panel screw.

10. The fastening arrangement according to claim 1, wherein the intermediate layer is at least one of a foam strip, an adhesive strip, an insulating felt or a plastic layer.

\* \* \* \* \*